(12) United States Patent
Hsu (10) Patent No.: US 11,977,840 B2
(45) Date of Patent: May 7, 2024

(54) DATA TRANSMISSION SYSTEM AND METHOD THEREOF

(71) Applicant: EZ-AI Inc., New Taipei (TW)

(72) Inventor: Yung Chang Hsu, New Taipei (TW)

(73) Assignee: EZ-AI Inc., New Taipei (TW)

( * ) Notice: Subject to any disclaimer, the term of this patent is extended or adjusted under 35 U.S.C. 154(b) by 394 days.

(21) Appl. No.: 17/392,409

(22) Filed: Aug. 3, 2021

(65) Prior Publication Data

US 2022/0043974 A1 Feb. 10, 2022

(30) Foreign Application Priority Data

Aug. 4, 2020 (TW) .................................. 109126401

(51) Int. Cl.
*G06F 40/279* (2020.01)
*G06F 16/951* (2019.01)
*G06F 16/953* (2019.01)
*G06F 40/30* (2020.01)
*H04L 67/53* (2022.01)

(52) U.S. Cl.
CPC .......... *G06F 40/279* (2020.01); *G06F 16/951* (2019.01); *G06F 16/953* (2019.01); *G06F 40/30* (2020.01); *H04L 67/53* (2022.05)

(58) Field of Classification Search
CPC .... G06F 40/279; G06F 16/951; G06F 16/953; G06F 40/30; G06F 16/3344; G06F 40/247; H04L 67/53
See application file for complete search history.

(56) References Cited

U.S. PATENT DOCUMENTS

| | | | | |
|---|---|---|---|---|
| 11,768,880 | B1 * | 9/2023 | Nemani | G06F 9/547 |
| | | | | 707/707 |
| 2009/0300208 | A1 * | 12/2009 | Lepeska | H04L 67/61 |
| | | | | 709/233 |
| 2020/0412828 | A1 * | 12/2020 | Zhu | H04L 67/1008 |
| 2021/0026906 | A1 * | 1/2021 | Reznik | G06F 16/248 |

FOREIGN PATENT DOCUMENTS

WO WO-2022015873 A2 * 1/2022 ............. G01S 19/08

\* cited by examiner

*Primary Examiner* — Mark D Featherstone
*Assistant Examiner* — Kweku William Halm
(74) *Attorney, Agent, or Firm* — Michael W. Taylor (57) ABSTRACT

The present invention provides a data transmission device and method thereof. A data transmission system includes: an electric device generating an input message; a Natural Language Processing (NLP) engine connected to the electric device, receiving the input message, and judging whether an output message corresponding to the input message is available on a real-time basis or on a non-real-time basis; a plurality of third-party servers; a service cloud framework connected to one of the NLP engine, the electric device, and the plurality of third-party servers to obtain a real-time information; and a buffer cloud framework connected to one of the NLP engine, the electric device and the plurality of third-party servers, proactively downloading at least one updated data from the plurality of third-party servers once in a predetermined period of time, automatically saving the at least one updated data therein, and obtaining a non-real-time information therefrom.

10 Claims, 7 Drawing Sheets

DATA TRANSMISSION SYSTEM AND METHOD THEREOF

CROSS-REFERENCE TO RELATED APPLICATIONS

The application claims the benefit of Taiwan Patent Application No. 109126401, filed on Aug. 4, 2020, at the Taiwan Intellectual Property Office, the disclosures of which are incorporated herein in their entirety by reference.

FIELD OF THE INVENTION

The present invention is related to a data transmission system and a method thereof. Particularly, the present invention is related to a data transmission system and a method thereof for using a Natural Language Processing (NLP) engine to judge whether an availability of the service demand is on a real-time basis or on a non-real-time basis.

BACKGROUND OF THE INVENTION

The term "computer" usually refers to a personal computer (PC, i.e. a classical computer) in normal usage. However, the most common form of the computer is an embedded computer, and is used to control other apparatus (e.g., airplane, industrial robot, or digital camera), and the invention of the robot is also well-known.

In the field of data transmission, not only the executive efficiency of the robot needs to be improved, but also there are similar problems in the fields of data search efficiency, data acquisition speed, and the operational burden of server of data transmission modes applied in a classical computer or a modernized AI hardware carrier. Facing various data interfaces of different electric devices/smart devices, there is an urgent need to unify the socket. Although a classifier in an NLP engine can judge semantics of the text message received, and distinguish whether the text message belongs to a command, a real-time information demand, or a non-real-time information demand, usually a web crawler is used to search massive network information, and save to the cloud to provide high quality search services to the netizen, but using the crawler database to cooperate with the service complexity has not been seen yet. Thus, it is always the device side (that is the client, e.g., robot or the client using the classical computer (PC)) itself that does the docking of the agreement with different clouds, which means the device needs to work frequently, and the operational burden of the third-party server is still heavy.

It is therefore the Applicant's attempt to deal with the problem of the heavy operational burden of the server when it is connected to various electric devices. Keeping the drawbacks of the prior art in mind, and through the use of robust and persistent experiments and research, the applicant has finally conceived of the present disclosure, which can overcome the drawbacks of the prior art, and the following is a brief description of the present disclosure.

SUMMARY OF THE INVENTION

The present disclosure discloses a data transmission system comprising an electric device, a Natural Language Processing (NLP) engine, a service cloud framework and a buffer cloud framework, the electric device is connected to a socket, the electric device is used to send out an input message, the NLP engine is connected to the electric device, when the input message is a text message, the NLP engine is used to receive the text message, and to engage in a semantic judgment towards the text message to judge whether the text message belongs to a command, a real-time information demand, or a non-real-time information demand, the service cloud framework includes a service manager and a plurality of service databases, and is connected to the NLP engine and the electric device, wherein the plurality of service databases are used to search a real-time information, the buffer cloud framework includes at least one crawler database connected to the NPL engine and the electric device, and used to search a non-real-time information, wherein when the text message belongs to the real-time information demand, the NLP engine transmits the real-time information demand to a specific service database of the plurality of service databases, the specific service database outputs the real-time information inquired therein according to the real-time information demand to the electric device, and when the text message belongs to the non-real-time information demand, the NLP engine transmits the non-real-time information demand to a specific crawler database of the at least one crawler database, the specific crawler database outputs the non-real-time information inquired therein according to the non-real-time information demand to the electric device.

In accordance with one more aspect of the present disclosure, a data transmission method comprises: using an electric device to send out an input message to a Natural Language Processing (NLP) engine; causing the NLP engine to receive the input message and to engage in a semantic judgment towards the input message to judge whether the input message belongs to a command, a real-time information demand, or a non-real-time information demand; when the input message requires the real-time information demand, executing the following steps: causing the NLP engine to send the input message to a service database; searching for a real-time information in the service database; causing the service database to output the real-time information to the electric device; and when the service database does not have the required real-time information, causing a third-party server to inquire the real-information, to respond to the electric device with the real-time information, and to return and to save the real-time information to the service database; and when the input message requires the non-real-time information demand, executing the following steps: causing the NLP engine to send the input message to a buffer cloud framework; causing the buffer cloud framework to obtain the non-real-time information from a specific crawler database of the at least one crawler database, wherein the at least one crawler database is connected to at least one crawler server, the at least one crawler server is connected to a plurality of third-party servers, and the at least one crawler server proactively downloads an updated data from the plurality of third-party servers once in a predetermined period of time; and causing the buffer cloud framework to output the non-real-time information to the electric device.

In accordance with one more aspect of the present disclosure, a data transmission system comprises: an electric device used to send out an input message; a Natural Language Processing (NLP) engine connected to the electric device, receiving the input message, and judging whether an availability of an output message being a feedback to the input message is on a real-time basis or on a non-real-time basis; a plurality of third-party servers; a service cloud framework connected to the NLP engine, the electric device, or the plurality of third-party servers to obtain a real-time information; and a buffer cloud framework connected to the NLP engine, the electric device, or the plurality of third-party servers, used to proactively download at least one updated data from the plurality of third-party servers once in a predetermined period of time, to automatically save the at least one updated data therein, and to obtain a non-real-time information therefrom, wherein: when the output message belongs to a real-time information, the NLP engine transmits the input message to the service cloud framework, the service cloud framework uses the real-time information inquired according to the input message as the output message to be sent to the electric device as a feedback; when the service cloud framework does not have the real-time information, the service cloud framework searches the real-time information from the corresponding third-party server, outputs the real-time information to the electric device and saves the real-time information therein; and when the output message belongs to a non-real-time information, the NLP engine transmits the input message to the buffer cloud framework, the buffer cloud framework uses the non-real-time information inquired according to the input message as the output message and sends the output message to the electric device as a feedback.

In accordance with one more aspect of the present disclosure, a data transmission system comprises: an electric device used to provide an input message, and to obtain a feedback message accordingly, wherein the feedback message includes a feedback message of a real-time information and a feedback message of a non-real-time information; a third-party server; a service cloud connected to the web with the electric device and the third-party server, and used to provide the feedback message of the real-time information inquired from the third-party server; a buffer cloud connected to the web with the electric device and the third-party server, used to proactively download at least one updated data from the third-party server once in a predetermined period of time, to automatically save the at least one updated data therein, and to obtain the feedback message of the non-real-time information therefrom; a Natural Language Processing (NLP) engine connected to the web with the electric device, receiving the input message, and judging a service demand represented by the input message; and a classifier affiliated to the NLP engine, and used to judge whether an availability of the service demand is on a real-time basis or a non-real-time basis.

BRIEF DESCRIPTION OF THE DRAWINGS

Other objectives, advantages and efficacies of the present invention will be described in detail below taken from the preferred embodiments with reference to the accompanying drawings.

DETAILED DESCRIPTION OF THE PREFERRED EMBODIMENTS

To increase the data search efficiency, the data acquisition speed, to decrease the operational burden of server, and to have the diversified smart devices, and to allow not only the classical computer, but also the intelligent robot, and the modernized AI hardware carrier to have a diversified interface/socket and to be distinguished from the classical interface, the data transmission system proposed in the present disclosure can let a cloud server handle a user's information demand based on operational principles of high efficiency. That is to say, the present disclosure can further decrease the time consumed for providing the information.

The present disclosure will now be described more specifically with reference to the following embodiments. It is to be noted that the following descriptions of preferred embodiments of this invention are presented herein for purpose of illustration and description only; they are not intended to be exhaustive or to be limited to the precise form disclosed. In the preferred embodiments, the same reference numeral represents the same element in each embodiment.

Figure 1:
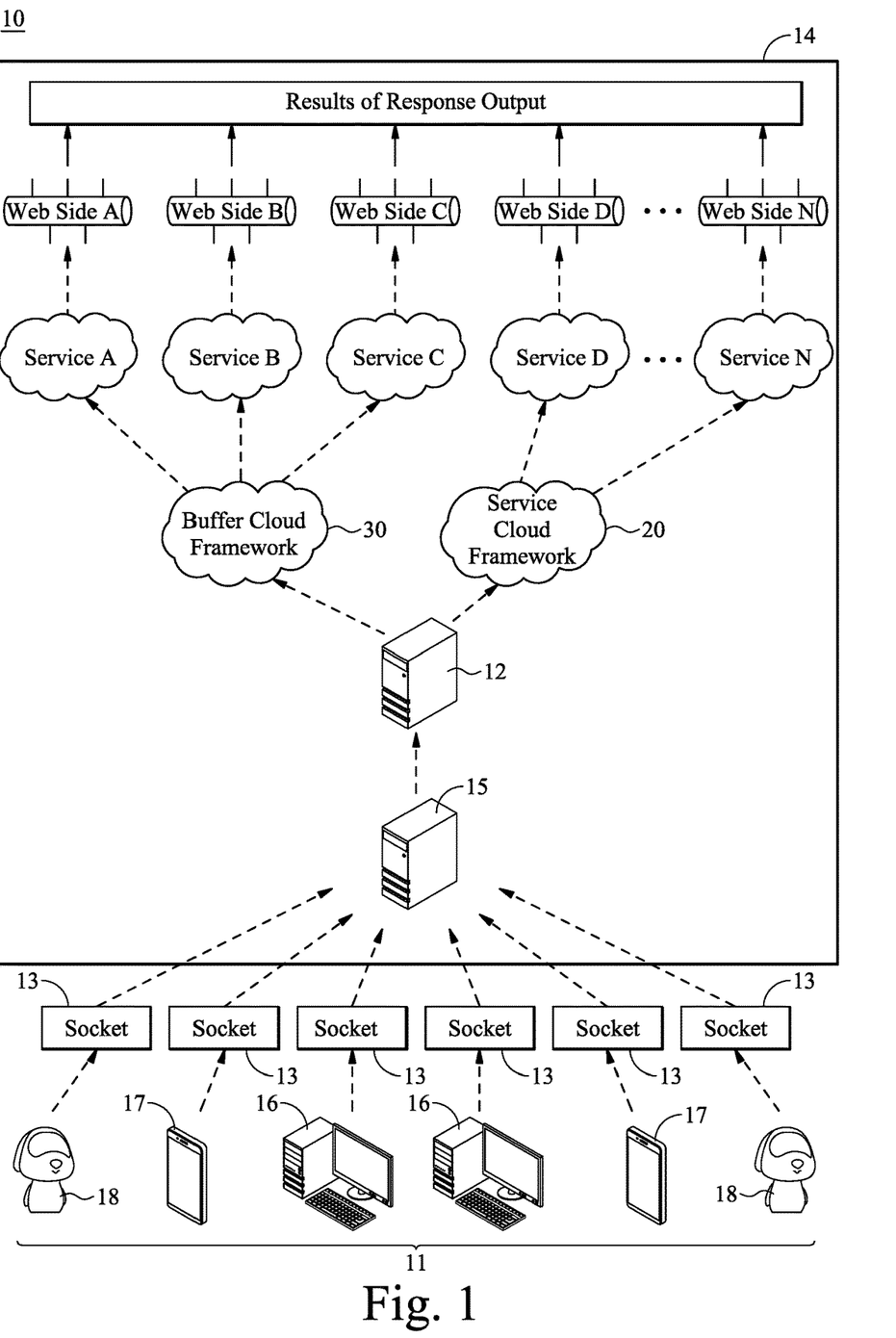
FIG. 1 shows a configuration schematic diagram of a data transmission system according to the preferred embodiment of the present invention.
Figure 2:
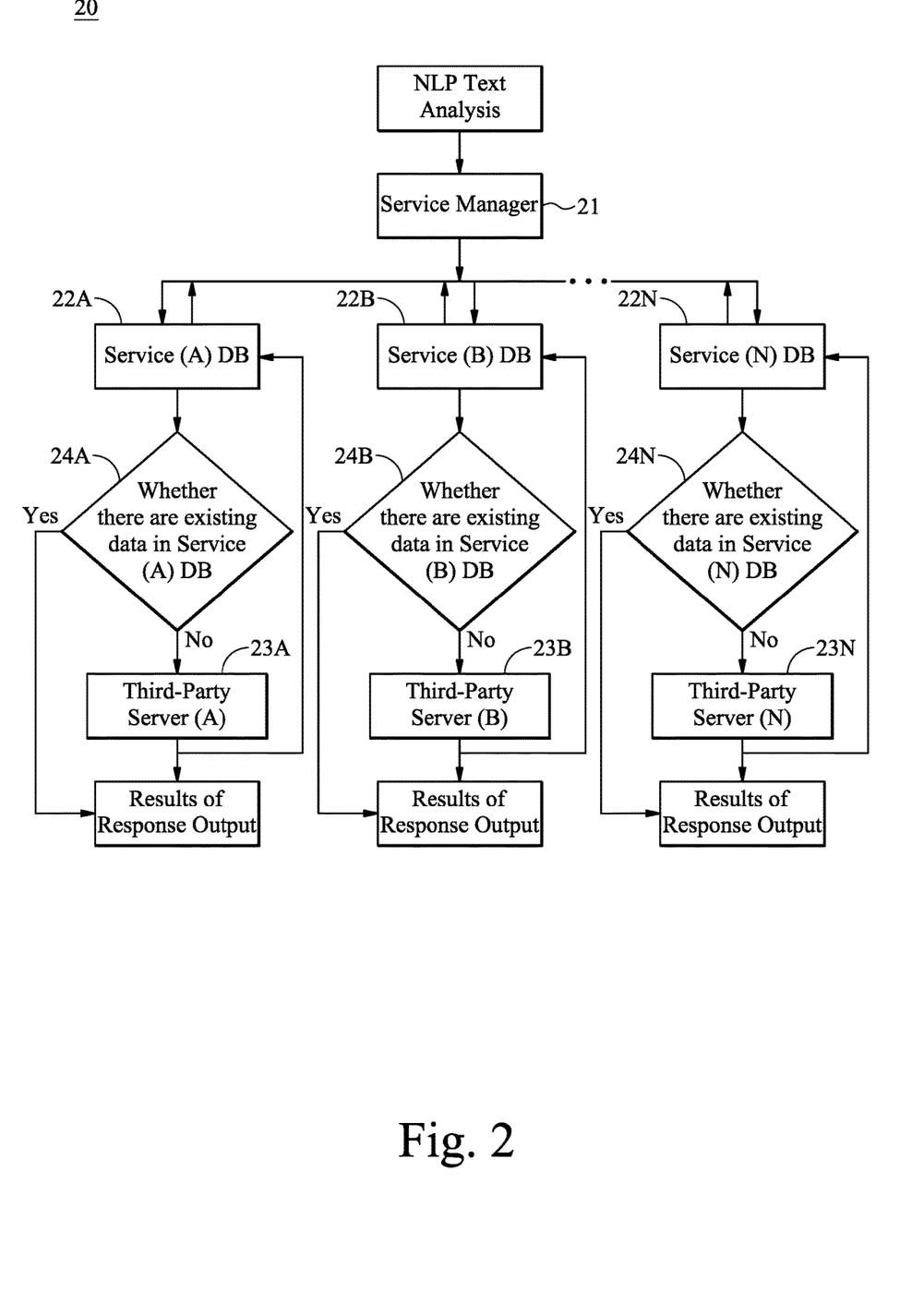
FIG. 2 shows a flowchart of the service cloud framework in FIG. 1.
Figure 3:
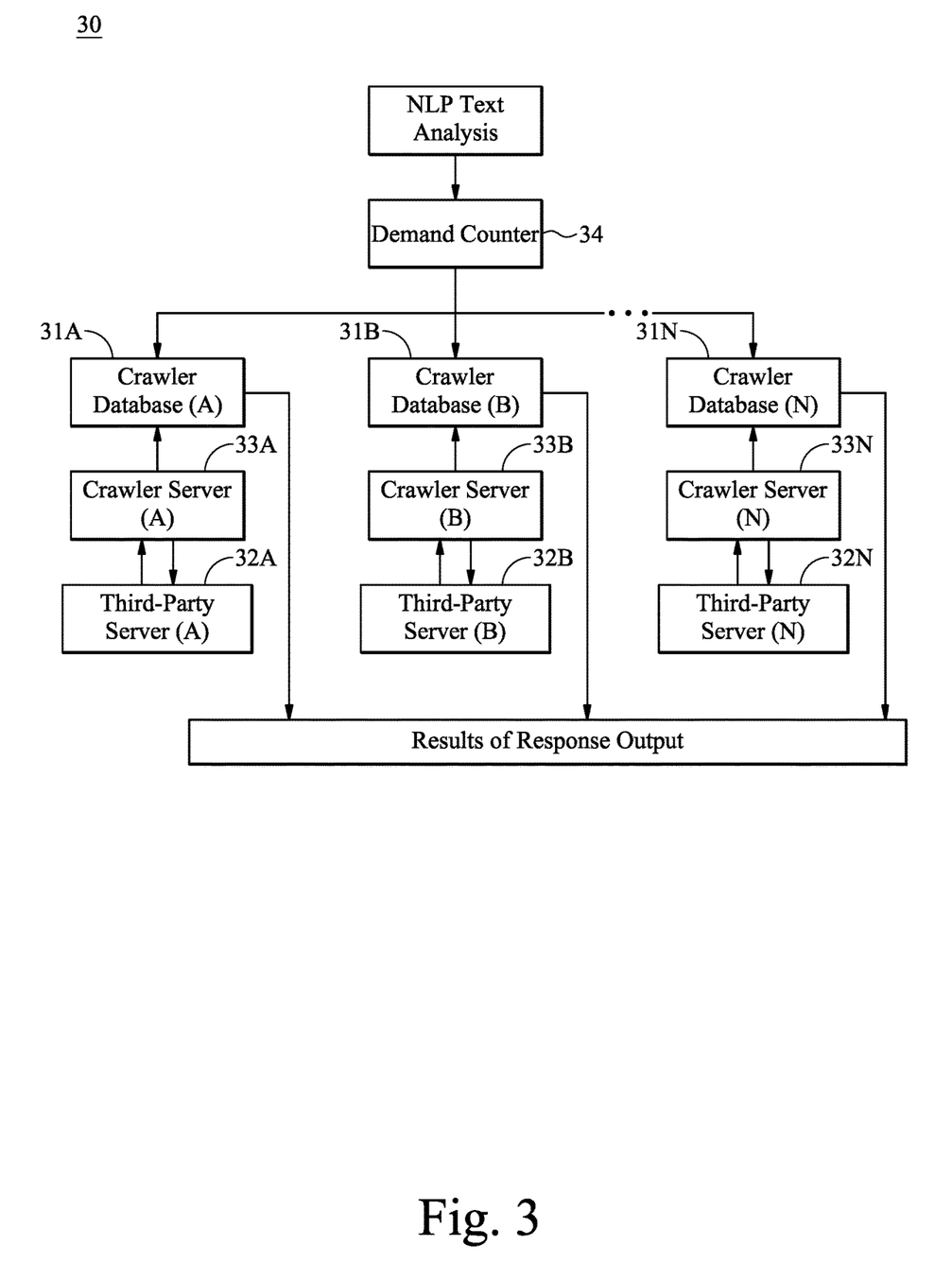
FIG. 3 shows a flowchart of the buffer cloud framework in FIG. 1.
Figure 4:
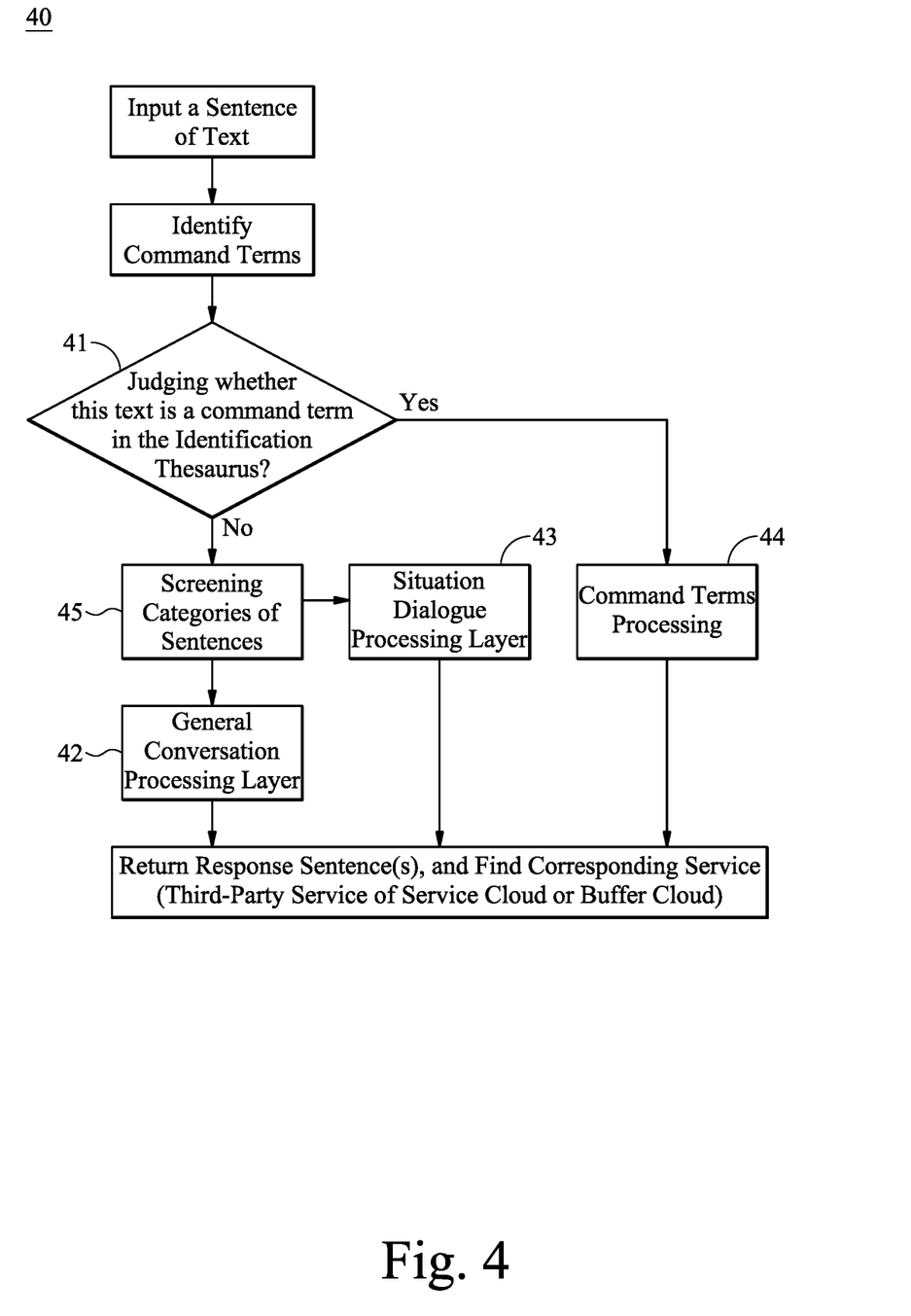
FIG. 4 shows a flowchart of the NLP engine in FIG. 1.

Please refer to FIG. 1, it shows a data transmission system 10 of the present invention, which includes an electric device 11, a Natural Language Processing (NLP) engine 12 (it located inside a data center 14), a service cloud framework 20 as shown in FIG. 2, and a buffer cloud framework 30 as shown in FIG. 3. The electric device 11 is connected to the socket 13, and is used to send out an input message. The NLP engine 12 is connected to the electric device 11, when the input message is a text message, the NLP engine 12 is used to receive the text message, and to engage in a semantic judgment (as shown in FIG. 4) towards the text message to judge whether the text message 41 belongs to a command, a real-time information demand (i.e. the general conversation processing layer 42 in FIG. 4), or a non-real-time information demand (i.e. the situation dialogue processing layer in FIG. 4). Please refer to FIG. 2, the service cloud framework 20 of the present disclosure includes a service manager 21, and a plurality of service databases 22A-22N connected to the NLP engine 12 and the electric device 11, wherein the plurality of service databases 22A-22N are used to search the real-time information. Please refer to FIG. 3, the buffer cloud framework 30 of the present disclosure includes at least one crawler database 31 (i.e. one of crawler bases A~N, e.g., crawler database (A) 31A) connected to the NLP engine 12 and the electric device 11, and searching for the non-real-time information, wherein when the text message belongs to the real-time information demand, the NLP engine 12 transmits the real-time information demand to a specific service database (i.e. the corresponding service database, e.g., the service database (A) 22A) of the plurality of service databases 22A-22N, the specific service database 22A outputs the real-time information inquired therein according to the real-time information demand to the electric device 11, and when the text message belongs to the non-real-time information demand, the NLP engine 12 transmits the non-real-time information demand to a specific crawler database (e.g., the crawler database (A) 31A) of the at least one crawler database 31, the specific crawler database 31A outputs the non-real-time information inquired therein according to the non-real-time information demand to the electric device 11.

Figure 5:
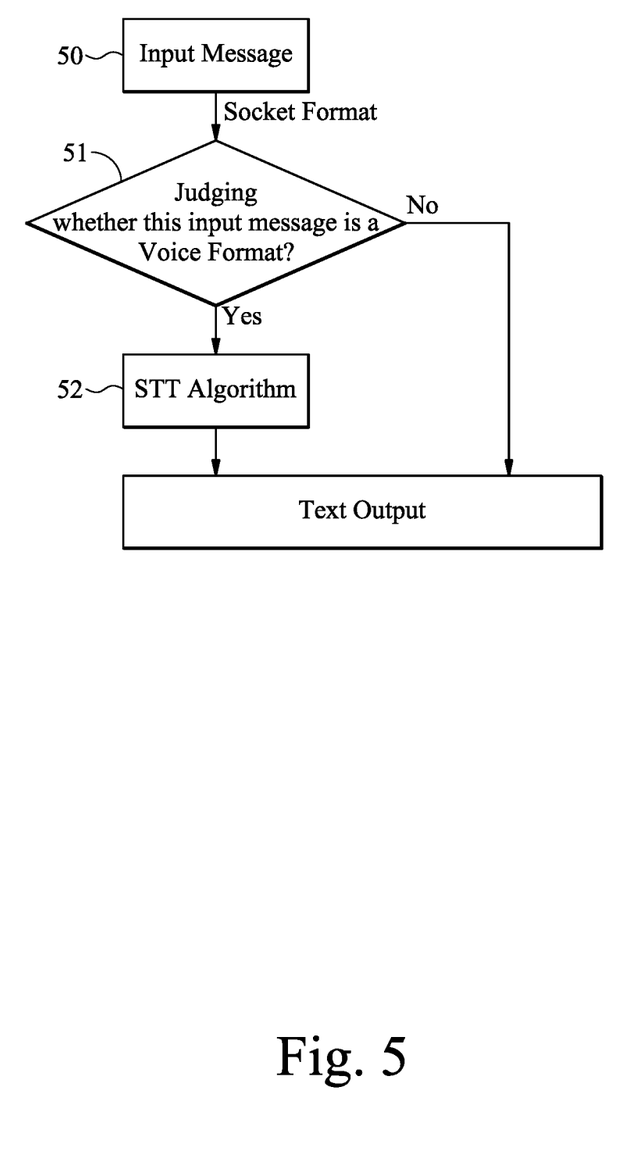
FIG. 5 shows a flowchart of the voice engine in FIG. 1.

In the afore-mentioned embodiments, the data transmission system 10 in FIG. 1 further includes a voice engine 15 connected to the socket 13 and is used to execute "Judging whether this input message 50 is a Voice Format 51" as shown in FIG. 5, wherein when the input message is the voice message, the voice engine 15 executes a speech to text (STT) algorithm 52 towards the voice message, turns the voice message to a specific text message, and transmits the specific text message to the NLP engine 12 to engage in the semantic judgment, the semantic judgment includes using the identification thesaurus to identify command terms 41 as shown in FIG. 4, when the text message is the command, Terms Processing 44), when the text message is not a command term, the classifier of the NLP engine 12 is used to engage in Screening Categories of Sentences 45, and the classifier is used to judge whether the text message is the real-time information demand or the non-real-time information demand. The NLP engine 12 categorizes the text message according to its enquiry time as the real-time information demand or the non-real-time information demand. When its enquiry time is no larger than 2.5 seconds, the NLP engine 12 will recognize the category of the text message as the real-time information demand, and the classifier will recognize it as providing an information which can be obtained in real-time, and thus it is categorized as the real-time information demand. When its enquiry time is larger than 2.5 seconds (a longer time), the NLP engine 12 will recognize the category of the text message as the non-real-time information demand, and the classifier will recognize it as providing an information required to be repeatedly checked against multiple data formats, or its enquiry time is larger than 2.5 seconds, the electric device 11 is a classical computer (PC) 16 or an embedded computer, and the embedded computer is located in a smart device (e.g., a mobile phone 17) or a modernized AI hardware carrier (e.g., a robot 18).

In the afore-mentioned embodiments, the data transmission system 10 in FIG. 1 further comprises a plurality of third-party servers 23A-23N (i.e. the server of the third-party service, or as is known as Third-Party Service Cloud, it is the database of the other host, and is also called Third-Party database) connected to and corresponding to the plurality of service databases 22A-22N as shown in FIG. 2, wherein when the specific service database 22 does not have the real-time information related to the real-time information demand, the specific service database 22 searches the real-time information related to the real-time information demand from the corresponding third-party server 23 (e.g., the Third-Party server (A) 23A, can be the Service D in FIG. 1, and has a Web Side D (indicated the location of the Third-Party Server 23A), and Service N will have Web Side N), outputs the real-time information to the electric device 11 and saves the real-time information in the specific service database 22. For example, if I want to inquire "Which mountain is the highest mountain in Taiwan?", after this sentence going through the text analysis of the NLP engine 12, it will be known that a Wikipedia type inquiry service will be engaged, and it will enter "the service database of Wikipedia 22", and it will inquiry whether there is data of the highest mountain in Taiwan, if there is an existing data in the database, and the answer will be replied immediately.

If there is no answer inquired in the database, and it will enter the host of Wikipedia (the Third-Party server 23) to inquire. Between the plurality of service databases 22A-22N and the plurality of third-party servers 23A-23N, a transmission is engaged by using a HyperText Transfer Protocol (HTTP, which is an application layer service definition applied to a distributed system, a coordinated system and a hypermedia information system), an Application Programming Interface (API, a method that a software operating in an end system requests an infrastructure of an internet to delivery information to a software having a specific purpose and operating in another end system), or a Web API (includes extensive functions, web applications are going through API interface, can realize capabilities of the storage service, the message service and the computing service, and use these capabilities to engage in web applications having strong functions) under the HTTP, and the Web API includes JavaScript Object Notation (JSON, a built-in plugin of browser having a rapid resolution) program language and Extensible Markup Language (XML, a markup language used to mark an electronic file to let it have constitutive property, it can be used to mark data and to define data types, it is quite suitable to engage in web data transmission, and it provides a unified method to describe or to exchange constitutive data being independent from an application program). The third-party server 23 goes through the web transmission interface of the APL or the Web API to immediately reply and to save the results of inquiry to the service database 22 of the Wikipedia, next time, when the same question is inquired again, there is no need to go into the third-party server 23 to engage in the inquiry.

In the afore-mentioned embodiments, the data transmission system 10 further includes a plurality of third-party servers (i.e. the servers of the third-party services) 32A-32N (they can provide Service A (server) connected to Web Side A, Service B connected to Web Side B and Service C connected to Web Side C etc, they and the third-party server 23 respectively belong to different machines) as shown in FIG. 3. The buffer cloud framework 30 further includes a crawler server 33 (e.g., crawler server (A) 33A, which and the crawler database 31 respectively belong to different machines, and data are taken out from the crawler server 33 and are put into the crawler database 31) connected to a specific crawler database 31 and one of a plurality of third-party servers 32, the crawler server 33 is used to proactively download at least one updated data from/to the third-party server (i.e. the service server) 32A-32N once in a predetermined period of time (periodically) to make sure that the data contents are the newest version of the present. The so-called "periodically time" can be minutes, hours, or even days, is judged according to the attributes of contents of the current third-party services, and once there is a new data, the crawler server 33 will automatically save/feedback and store the updated data to the at least one crawler database 31, if it is circulated in this way, the data in the crawler database 31 is updated. The buffer cloud framework 30 further includes a demand counter 34 connected to the NLP engine 12 and the at least one crawler database 31, the demand counter 34 is used to count a usage count of each third-party server 32 further to know the frequency of times of third-party service (popular query level), if it happens more frequently and has high frequency, then it has high popularity. Thus, in a data update, it is further required to have the immediacy. The crawler server 33 determines an updated sequence of downloading the at least one updated data from the plurality of third-party servers 32 according to a sequence of the usage count. Regarding the position adjustment of the updated frequency, for example, if the total times of the demand counter 34 is 50, the third-party server (A) 32A appears two times, the third-party server (B) 32B appears 18 times, the third-party server (C) 32C appears 8 times, the third-party server (D) appears 22 times, after ranking the sequence, the priority of crawler server 33 in acquisition of the third-party data will be dynamically adjusted to the third-party server (D)>the third-party server (B)>the third-party server (C)>the third-party server (A).

Between the crawler server 33 and the plurality of third-party servers 32, a transmission is engaged by using a HyperText Transfer Protocol (HTTP), an Application Programming Interface (API), or a Web API is used under the HTTP, and the Web API includes JavaScript Object Notation (JSON) and Extensible Markup Language (XML).

Figure 6:
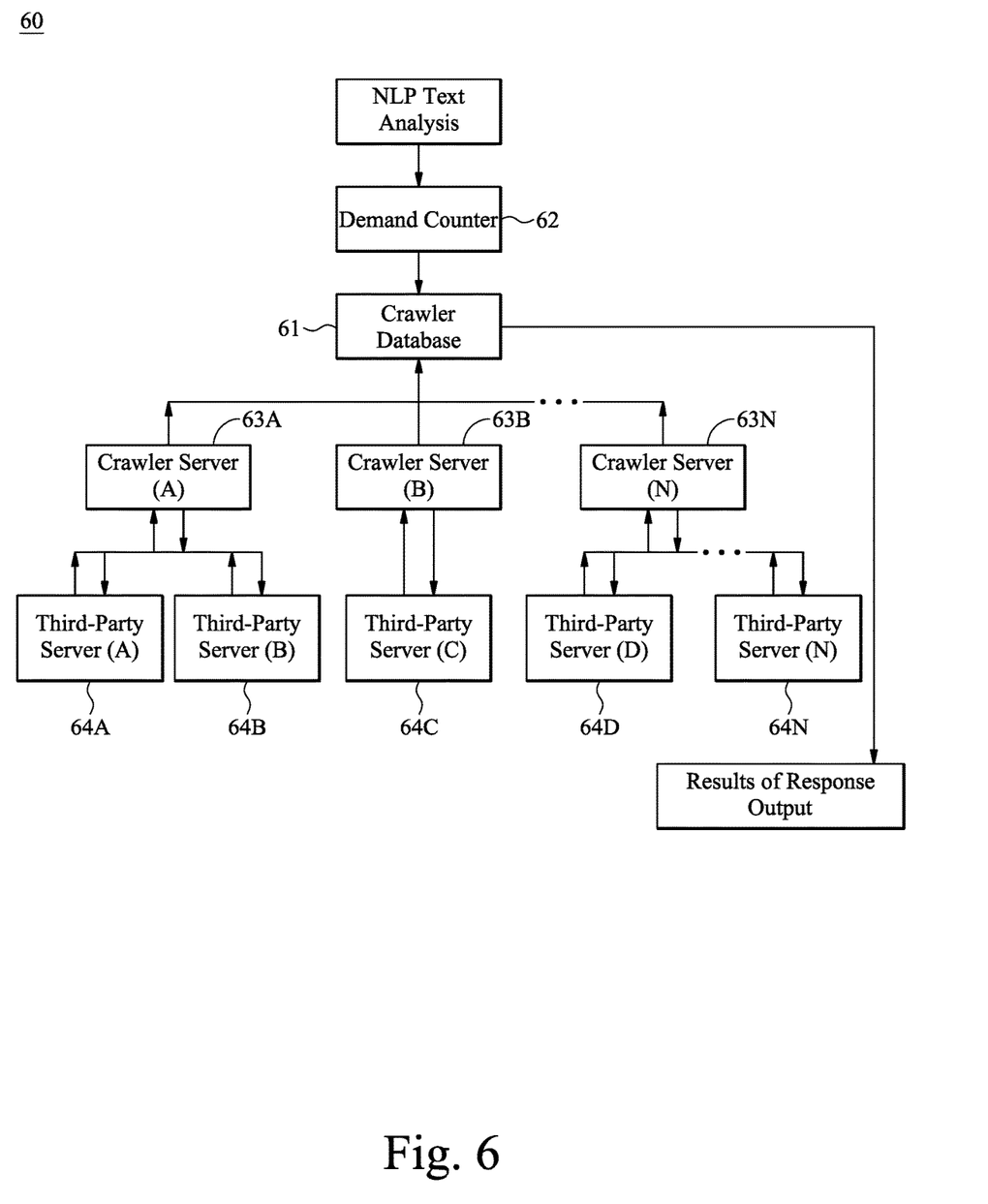
FIG. 6 shows a flowchart of another buffer cloud framework according to the preferred embodiment of the present invention.
Figure 7:
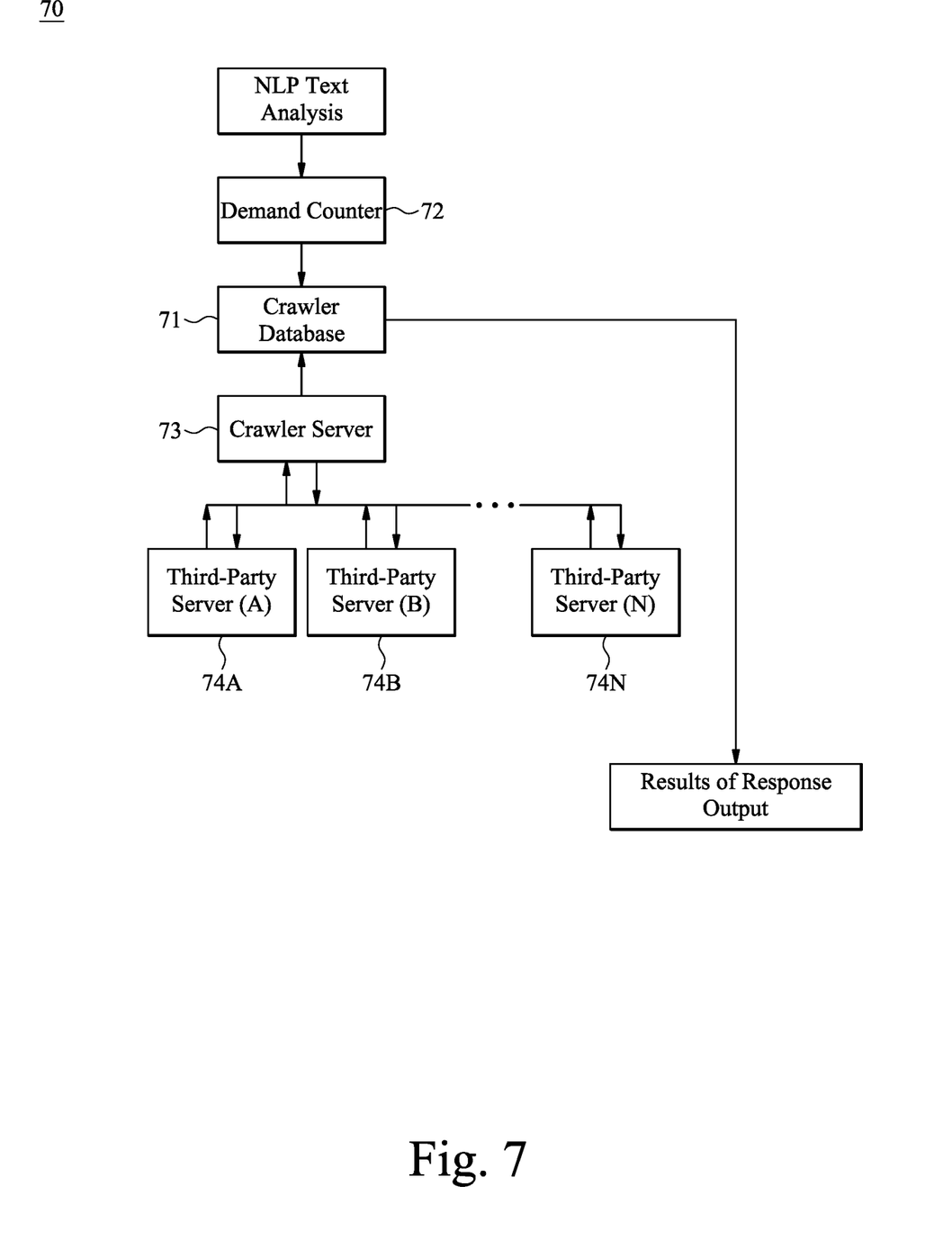
FIG. 7 shows a flowchart of still another buffer cloud framework according to the preferred embodiment of the present invention.

According to other feasible points of view, the present disclosure further discloses a data transmission method comprising: using an electric device 11 to send out an input message to a Natural Language Processing (NLP) engine 12; causing the NLP engine 12 to receive the input message and to engage in a semantic judgment towards the input message to judge whether the input message belongs to a command, a real-time information demand, or a non-real-time information demand; when the input message requires the real-time information demand, executing the following steps: causing the NLP engine 12 to send the input message to a service database 22; searching for a real-time information in the service database 22; causing the service database 22 to output the real-time information to the electric device 11; and when the service database 22 does not have the required real-time information, causing a third-party server 23 to inquire the real-information, to respond to the electric device 11 with the real-time information, and to return and to save the real-time information to the service database 22; and when the input message requires the non-real-time information demand, executing the following steps: causing the NLP engine 12 to send the input message to a buffer cloud framework 30/60/70; causing the buffer cloud framework 30/60/70 to obtain the non-real-time information from a specific crawler database (e.g., the crawler database (A) 31A of the at least one crawler database, wherein the at least one crawler database is connected to at least one crawler server, the at least one crawler server is connected to a plurality of third-party servers 23, and the at least one crawler server proactively downloads an updated data from the plurality of third-party servers 23 once in a predetermined period of time; and causing the buffer cloud framework 30/60/70 to output the non-real-time information to the electric device 11.

In the afore-mentioned embodiments, the data transmission method further comprises: using a voice engine 15 to judge whether the input message is a text message or a voice message, wherein: when the input message is the text message, the text message is directly transmitted to the NLP engine 12 to engage in the semantic judgment; and when the input message is the voice message, the voice engine executes a speech to test (STT) algorithm towards the voice message, turns the voice message to a specific text message, and sends the specific text message to the NLP engine 12 to engage in the semantic judgment.

In the afore-mentioned embodiments, the NLP engine 12 is connected to a service manager 21 as shown in FIG. 2, and the service manager 21 is used to assign the service database 22, when the service database 22 does not have the real-time information, the third-party server 23 is entered to engage in an inquiry regarding "whether there are the real-time information (existing data) in Service Databases" 24, the Third-Party Server 23 responds and outputs the real-time information to the electric device 11, and feedbacks and saves the real-time information to the service databases 22, the data transmission method further includes the following steps: causing a buffer cloud framework 60 as shown in FIG. 6 to include a demand counter 62, causing a single crawler database 61 to be the specific crawler database, causing the text message to go through the demand counter 62 and to enter the single crawler database 61 to engage in a inquiry, the single crawler database 61 is connected to the specific crawler server (e.g., the crawler server (A) 63A), and the specific crawler server is one of the plurality of crawler server 63, the specific crawler server is connected to a specific third-party server (e.g., the third-party server (A) 64A), the specific third-party server is the third-party server (A) 64A or the third-party server (B) 64B (these two third-party server (A) and third-party server (B) can be changed to N third-party servers).

Each crawler server 63 will proactively update data towards the third-party service server (i.e. the third-party server 64); the crawler server 63 and the third-party server 64 are communicated with each other through the interface such as the API or the Web API. The specific crawler server 63 dynamically adjusts an updated sequence of priorities of the specific third-party server according to a usage count (the frequency of the usage) of a third-party service. For example, in the crawler server (A) 63A, the ranking sequence of the third-party server (B) 64B>the third-party server (A) 64A, the crawler server (A) 63A will update the data towards the third-party server (B) 64B first, and after this update is finished, the crawler server (A) 63A will update the data towards the third-party server (A) 64A next, and if it is circulated in this way, the data in the databases will be updated regularly. The crawler server (A) 63A, the crawler server (B) 63B . . . the crawler server (N) 63N will feedback and save the updated data to the crawler database 61, each of the plurality of crawler servers 63 feedbacks and saves the updated data to the crawler database 61, and if it is circulated in this way, the data in the databases will be updated regularly.

In the afore-mentioned embodiments, a buffer cloud framework 70 as shown in FIG. 7 includes a demand counter 72 and a single crawler database 71, and the data transmission method further includes the following steps: causing a buffer cloud framework 70 as shown in FIG. 7 to include a demand counter 72, causing a single crawler database 71 to be the specific crawler database, causing the text message to go through the demand counter 72 and to enter the single crawler database 71 to engage in a inquiry, the single crawler database 71 is connected to a crawler server 73, the crawler server 73 is connected to a specific third-party server 74 (e.g., the third-party server (A) 74A), the crawler server 73 is used to proactively download an updated data from the plurality of third-party servers 74A-74N once in a predetermined period of time, the crawler server 73 and the third-party server 74 communicate with each other through the interface such as the API or the Web API. The specific third-party server 74 is one of the plurality of third-party servers 74A-74N, the crawler server 73 will feedback and save the updated data to the crawler database 71, and if it is circulated in this way, the data in the databases will be updated regularly. The crawler server 73 dynamically adjusts an updated sequence of priorities of the third-party server 74 according to a usage count (the frequency of the usage) of a third-party service of the demand counter 72. For example, the ranking sequence of the third-party server (B) 74B>the third-party server (C) 74C>the third-party server (A) 74A, the crawler server 73 will update the data towards the third-party server (B) 74B first, it will update the data towards the third-party server (C) 74C next, then it will update the data towards the third-party server (A) 74A, and if it is circulated in this way, the data in the databases will be updated regularly.

The present disclosure can be a data transmission system 10 comprising: an electric device 11, a Natural Language Processing (NLP) engine 12, a service cloud framework 20 and a buffer cloud framework 30. The electric device 11 is used to send out an input message, the Natural Language Processing (NLP) engine 12 is connected to the electric device 11, receiving the input message, and judging whether an availability of an output message being a feedback to the input message is on a real-time basis or on a non-real-time basis. The service cloud framework 20 is connected to the NLP engine 12 and the electric device 11, and is used to obtain a real-time information, the buffer cloud framework 30 is connected to the NLP engine 12 and the electric device 11, and is used to obtain a non-real-time information, wherein when the output message belongs to a real-time information, the NLP engine 12 transmits the input message to the service cloud framework 20, the service cloud framework 20 uses the real-time information inquired according to the input message as the output message to be sent to the electric device 11 as a feedback, and when the output message belongs to a non-real-time information, the NLP engine 12 transmits the input message to the buffer cloud framework 30, the buffer cloud framework 30 uses the non-real-time information inquired according to the input message as the output message and sends the output message to the electric device 11 as a feedback.

The present disclosure can be a data transmission system 10 comprising: an electric device 11, a service cloud (i.e. a service cloud framework 20), a buffer cloud (i.e. a buffer cloud framework 30), a Natural Language Processing (NLP) engine 12 and a classifier (not shown). The electric device 11 is used to provide an input message, and to obtain a feedback message accordingly, wherein the feedback message includes a feedback message of a real-time information and a feedback message of a non-real-time information, the service cloud is connected to the web with the electric device 11 and is used to provide the feedback message of the real-time information, the buffer cloud is connected to the web with the electric device 11 and is used to provide the feedback message of the non-real-time information, the NLP engine 12 is connected to the web with the electric device 11, is used to receive the input message, and judges a service demand represented by the input message, the classifier is affiliated to the NLP engine 12, and is used to judge whether an availability of the service demand is on a real-time basis or a non-real-time basis.

The operational modes between the service databases 22 and the crawler databases 31, and their respective third-party servers 23, 32 are as follows: using the keywords to search, and setting up the keyword thesaurus or the inquiry thesaurus in the service database 22 and the crawler database 31. In a predetermined period of time, the service databases 22 and the crawler databases 31 will automatically access the data in their respective third-party servers 23, 32, send these data back to the service databases 22 and the crawler databases 31, and then wait for the smart hardware/device to call. Therefore, the connections between the service databases 22 and the crawler databases 31, and their respective third-party servers 23, 32 will use the thesaurus to classify and to correspond. Using the service databases 22 and the crawler databases 31 to store the data, there will be accurate parameters to raise the efficiency, for example, if it took 10 seconds before, it will be improved to take only 5 seconds now when this method is used. When the classifier is independent from the NLP 12, then it can be viewed as a kind of weighing server.

The data transmission system of the present disclosure can also be named as a cloud server framework/configuration based on a high efficiency of processing. The present disclosure of the patent application is different from the prior art, using different devices/carriers and client-side (i.e. the electric device 11) including PC client-side, smart phone, smart robot and cloud server going through the voice engine 15 and the NLP engine 12 to engage in the message analysis to find the corresponding third-party data message to quick search the corresponding server to engage in the data inquiry. As for the agreement on the device-side, various carriers including the PC client side, the smart phone, the smart robot, and the cloud server all can use the socket 13 to engage in message transfer simultaneously with the data center 14. In this way, the smart hardware device, PC client side and the cloud server can all engage in data communication with the voice engine 15.

The socket 13 is located on the internet, if the user or the APP is connected to a socket, then it can be linked to any socket on the internet, and the communications between each other are the same as the communications between processes in the operating system. At the same time, it is an inter-process communication mechanism provided by the operating system, a transfer protocol, and usually it will provide socket API for the APP. APP can go through the socket interface to use the network socket. When it is engaged in the data communication with the third-party servers 23, 32 for a very long time, or the data update, then this format is required. Furthermore, the required various functional services are separated into two categories according to the data complexities, that is to say the real-time information and the non-real-time information, and it is separated according to the required length of time and the speed of the inquired data. The classifier in the NLP engine engaged in the understanding of the natural language will predefine the types being inquired. After the speech turns into the text (the STT algorithm 52), the related text will be categorized, and be separated into four kinds: (a) conversation type (dialogue in daily life, text without any specific intention), (b) non-real-time information inquiry (refer to delicacy/news/railway timetable/multimedia songs etc.), (c) real-time information inquiry (refer to Wikipedia/weather/horoscope/stock etc), (d) command term (smart home and internet of things).

In the present disclosure, the buffer cloud framework 30 is used to provide an information required to be searched in a longer time or required to be repeatedly checked against multiple data formats. For example, Cuisine Map, it requires to inquire cities, districts, food categories, restaurant categories etc. There are so many cuisine restaurants. If the user temporarily requires to do an inquiry, it must spend some time to do the search. If the information is searched in advance and is put into a database beforehand, then the search time can be sped up. Using news and current affairs as an example, the news categories need to be inquired, the date of the news event, the news immediacy, the news source, etc. News categories are so many, and are frequently updated, when the user enables the inquiry, there will be a period of time for the search and inquiry of the news database. If the news can be searched and categorized in advance and is put into a crawler database 31 beforehand, then the user can engage in an inquiry and use the results obtained at anytime. Using timetables of trains as an example, there are dialogue situations such as ticket purchase process and the number of trains, and it is required to inquire the starting point of ticket purchase, ticket destination, time and date of buying ticket, boarding time etc. For example, timetables of trains are quite a lot and need to be updated from time to time. Using movie schedules as an example, there are theater locations, film genres and playing times that need to be inquired. Using multimedia songs as an example, because the singers and the songs are so many, if a real-time remote inquiry is engaged, it may take a relatively longer time. Thus, if the data can be engaged in an inquiry or can be categorized in advance, then when the user uses the data, the user can inquire the crawler database 31 in real-time, and it is convenient to invoke in real-time.

In the present disclosure, the service cloud framework 20 is used to provide an information which can be obtained in real-time. Using Medicine as an example, the name of the disease, the cause of disease, and the treatment can be inquired immediately. Using Wikipedia as an example, the relative explanation can be inquired immediately. Wikipedia belongs to a third-party database (i.e. the third-party server 23), the data has been categorized in advance, and has the exclusive API to use, thus the user does not need to engage in an additional inquiry in advance. Using stocks as an example, the real-time stock price can be inquired immediately. Using weather as an example, it is required to inquire complex data of the weather of countries, areas, and villages, and the temperature and the humidity etc. The data amount of the weather database is relatively small, the inquiry speed is relatively quick, and can be inquired when it is needed, and there is no need to load into the crawler database 31 in advance. Using horoscopes as an example, the daily horoscope can be inquired immediately, the data volume is relatively small, and the data retrieval time is relatively quicker. Using exchange rates as an example, the bank exchange rate can be inquired in real-time, it will enter the third-party server 23 (or named as the third-party database) and engage in data retrieval. After distinguishing in this way, the loading of the service cloud framework 20 and the buffer cloud framework are decreased, and various types of data can be obtained in real-time. After going through the NLP engine 12, the text went through the semantic realization, and the field of the third service to be obtained will be known. For example, "I want to ask for the weather of Taipei tomorrow." will correspond to the field of "weather service". "I want to ask for the historical celebrities" will correspond to the field of "Wikipedia service". "I want to ask for today's fortune of Taurus" will correspond to the field of "the fortune of horoscope service". The NLP engine 12 can obtain various fields of third-party servers/service databases, can distribute the message to the buffer cloud framework 30 and the service cloud framework 20 and they will engage in the data inquiry.

The experiment regarding engage in data inquiry, and the inquiry results regarding the total number of records are listed as follows. (1) inquiry of the Wikipedia, over a million records, each inquiry will spend 1.093 second of the API time. (2) inquiry of the weather: from the Central Weather Bureau, MOTC, there are over 1,000 records, each inquiry will spend 1.093 second of the API time. If we take the inquiry time into account, then less than 2.5 seconds (including 1.5 seconds) can be concluded as the real-time information (belongs to the service cloud framework 20). According to the actual data experiment of the buffer cloud framework 30: The difference between including the buffer cloud framework and without including the buffer cloud framework 30 can be obtained. (3) Inquiry of the Youtube songs: In Youtube, there are more than 1 billion songs. When the desired songs are stored in the crawler database 31 in advance, then every inquiry will spend 3.066 seconds of API time. When the crawler database 31 has no data, then every inquiry to a third-party server 32/third-Party database will spend 4.116 seconds of API time. Adding the scheme of search processing in the crawler database 31 in advance, it can effectively reduce the time of searching the data. In general, the data which will require relatively longer inquiry time can be concluded as non-real-time information (belong to the buffer cloud framework 30).

The main point of the present disclosure are as follows: (1) the revolution of the framework of the server, can raise the data transmission efficiency of the classical framework; (2) apply various classical interfaces of Json, Http, Socket, APL and Web API etc. to redefine the data transmission configuration, and use various data to engage in the Structured Data Interface; (3) adding the voice engine 15 to identify, and using the NLP engine 12 to engage in the semantic realization as the judging rules before the data transmission to raise the speed of the data transmission. When at the same time, there are several thousands of smart device or API interfaces are requesting for data from the third-party server 23, 32, the concurrent loading capability will be tested. If there is no systematic load balance scheme such as proposed in the present disclosure, when the number of clients is relatively larger, some of them will not enjoy the service from the third-party server 23, 32, and there will be delays, which will result in instability of the system.

In conclusion, the present disclosure can obtain an effect of shortening the time required for providing the information. Through the NLP engine judging whether the text message belongs to the real-time demand or the non-real-time demand, and the mode whereby the service cloud framework and the buffer cloud framework cooperate with each other can really obtain the efficiency of raising the effect of data search and inquiry.

While the invention has been described in terms of what is presently considered to be the most practical and preferred embodiments, it is to be understood that the invention need not be limited to the disclosed embodiments. Therefore, it is intended to cover various modifications and similar configurations included within the spirit and scope of the appended claims, which are to be accorded with the broadest interpretation so as to encompass all such modifications and similar structures.

The invention claimed is:

1. A data transmission system, comprising:
   an electric device connected to a socket and generating an input message;
   a Natural Language Processing (NLP) engine electrically connected to the electric device, wherein when the input message is a text message, the NLP engine receives the text message, and exercises a semantic judgment on the text message to judge whether the text message belongs to which one of a command, a real-time information demand, and a non-real-time information demand;
   a plurality of third-party servers;
   a service cloud framework including a service manager and a plurality of service databases, wherein the service cloud framework is connected to one of the NLP engine, the electric device, and the plurality of third-party servers, and the plurality of service databases search a real-time information; and
   a buffer cloud framework including:
      at least one crawler database connected to the NPL engine and the electric device, and searching a non-real-time information; and
      a crawler server connected to one of the at least one crawler database and the plurality of third-party servers, proactively downloading at least one updated data from the plurality of third-party servers once in a predetermined period of time and automatically saving the at least one updated data to the at least one crawler database, wherein:

when the text message belongs to the real-time information demand, the NLP engine transmits the real-time information demand to a specific one of the plurality of service databases, and the specific service database outputs therefrom the real-time information matching the real-time information demand to the electric device;

when the specific service database does not have the real-time information related to the real-time information demand, the specific service database searches the real-time information from a specific one of the third-party servers corresponding to the real-time information demand, outputs the searched real-time information to the electric device and saves the real-time information therein; and when the text message belongs to the non-real-time information demand, the NLP engine transmits the non-real-time information demand to a specific one of the at least one crawler database, and the specific crawler database outputs therefrom the non-real-time information matching the non-real-time information demand to the electric device.

2. The data transmission system according to claim 1, further comprising a voice engine, wherein:

the NLP engine is located inside a data center and includes a classifier and an identification thesaurus;

the voice engine is connected to the socket, and is used to judge whether the input message is the text message or a voice message;

when the input message is the voice message, the voice engine executes a speech to text (STT) algorithm towards the voice message, turns the voice message to a specific text message, and transmits the specific text message to the NLP engine to engage in the semantic judgment, wherein the semantic judgment includes using the identification thesaurus to identify command terms;

when the text message is a command, a corresponding service is found and executed directly;

when the text message is not a command, the classifier engages in a screening of the categories of sentences, wherein the classifier judges whether the text message is the real-time information demand or the non-real-time information demand, the real-time information demand is categorized by the classifier as the demand of an information which can be obtained in real-time, and searched no larger than 2.5 seconds, the non-real-time information demand is categorized by the classifier as the demand of an information that needs be repeatedly checked against multiple data formats or cannot be completed within 2.5 seconds, and the electric device is a classical computer or an embedded computer; and the embedded computer is located in a smart device or a modernized AI hardware carrier.

3. The data transmission system according to claim 1, wherein between the plurality of service databases and the plurality of third-party servers, a transmission is engaged by using a HyperText Transfer Protocol (HTTP), an Application Programming Interface (API), or a Web API is used under the HTTP, and the Web API includes JavaScript Object Notation (JSON) and Extensible Markup Language (XML).

4. The data transmission system according to claim 1, wherein:

the buffer cloud framework further includes a demand counter connected to the NLP engine and the at least one crawler database;

the demand counter counts a usage count of each third-party server;

the crawler server determines an updated sequence of downloading the at least one updated data from the plurality of third-party servers according to a sequence of the usage count;

between the crawler server and the plurality of service databases, a transmission is engaged by using a HyperText Transfer Protocol (HTTP), and an Application Programming Interface (API) or a Web API is used under the HTTP, wherein the Web API includes JavaScript Object Notation (JSON) and Extensible Markup Language (XML).

5. A data transmission method, comprising:

using an electric device to send out an input message to a Natural Language Processing (NLP) engine;

causing the NLP engine to receive the input message and to engage in a semantic judgment towards the input message to judge whether the input message belongs to one of a command, a real-time information demand, and a non-real-time information demand;

when the input message relates to the real-time information demand, executing the following steps:

causing the NLP engine to send the input message to a service database;

searching for a real-time information in the service database;

causing the service database to output the real-time information to the electric device; and when the service database does not have the required real-time information, causing a third-party server to search the real-time information, to respond to the electric device with the real-time information, and to return and to save the real-time information in the service database; and when the input message relates to the non-real-time information demand, executing the following steps:

causing the NLP engine to send the input message to a buffer cloud framework;

causing the buffer cloud framework to obtain the non-real-time information from a specific crawler database of at least one crawler database, wherein the at least one crawler database is connected to the at least one crawler server, the at least one crawler server is connected to a plurality of third-party servers, and the at least one crawler server proactively downloads an updated data from the plurality of third-party servers once in a predetermined period of time; and causing the buffer cloud framework to output the non-real-time information to the electric device.

6. The data transmission method according to claim 5, further comprising:

using a voice engine to judge whether the input message is a text message or a voice message, wherein:

when the input message is the text message, the text message is directly transmitted to the NLP engine for the semantic judgment; and when the input message is the voice message, the voice engine executes a speech to test (STT) algorithm towards the voice message, turns the voice message to a specific text message, and sends the specific text message to the NLP engine for the semantic judgment.

7. The data transmission method according to claim 5, wherein the NLP engine is connected to a service manager, and the service manager is used to assign the service database, further comprising: causing the buffer cloud framework to include a demand counter, wherein:
  the text message goes through the demand counter and enters the at least one crawler database to engage in an inquiry;
  the at least one crawler server is a plurality of crawler servers; and
  the specific crawler database is connected to a specific crawler server of the plurality of crawler servers, wherein the specific crawler server is connected to a specific third-party server of the plurality of third-party servers to download the updated data and dynamically adjusts an updated sequence of priorities of the specific third-party server according to a usage count of a third-party service of the demand counter, and the specific crawler servers feedbacks and saves the updated data to the at least one crawler database.

8. The method according to claim 5, further comprising: causing the buffer cloud framework to include a demand counter, wherein:
  the text message goes through the demand counter and enters the at least one crawler database for searching;
  the at least one crawler server is a crawler server; and
  the specific crawler database is connected to the crawler server, wherein the crawler server is connected to a specific third-party server of the plurality of third-party servers to download the updated data, the crawler server dynamically adjusts an updated sequence of priorities of the specific third-party server according to a usage count of a third-party service of the demand counter, and the crawler server feedbacks and saves the updated data to the at least one crawler database.

9. A data transmission system, comprising:
  an electric device generating an input message;
  a Natural Language Processing (NLP) engine connected to the electric device, receiving the input message, and judging whether an output message corresponding to the input message is available on a real-time basis or on a non-real-time basis;
  a plurality of third-party servers;
  a service cloud framework connected to one of the NLP engine, the electric device, and the plurality of third-party servers to obtain a real-time information;
  a buffer cloud framework connected to one of the NLP engine, the electric device and the plurality of third-party servers, proactively downloading at least one updated data from the plurality of third-party servers once in a predetermined period of time, automatically saving the at least one updated data therein, and obtaining a non-real-time information therefrom; and
  a classifier, wherein:
  the output message includes a feedback message of the real-time information and a feedback message of the non-real-time information;
  the plurality of third-party servers include a specific third-party server;
  the service cloud framework includes a service cloud, wherein the service cloud is connected to the web with the electric device and the specific third-party server and provides the feedback message of the real-time information searched from the specific third-party server;
  the buffer cloud framework includes a buffer cloud, wherein the buffer cloud is connected to the web with the electric device and the specific third-party server, proactively downloads at least one updated data from the specific third-party server once in a predetermined period of time, automatically saves the at least one updated data therein, and obtains the feedback message of the non-real-time information therefrom;
  the NLP engine is connected to the web with the electric device, receives the input message, and judges a service demand represented by the input message; and
  the classifier is connected to the NLP engine and judges whether the service demand is available on the real-time basis or on the non-real-time basis.

10. The data transmission system according to claim 9, wherein:
  when the output message belongs to the real-time information, the NLP engine transmits the input message to the service cloud framework, and the service cloud framework searches the real-time information matching the input message as the output message to be sent to the electric device;
  when the service cloud framework does not have the real-time information, the service cloud framework searches the real-time information from a corresponding one of the third-party servers, outputs the real-time information to the electric device and saves the real-time information therein; and
  when the output message belongs to the non-real-time information, the NLP engine transmits the input message to the buffer cloud framework, and the buffer cloud framework searches the non-real-time information matching the input message as the output message and sends the output message to the electric device.

* * * * *